(12) United States Patent
Cheng

(10) Patent No.: US 7,177,146 B2
(45) Date of Patent: Feb. 13, 2007

(54) LOCK FOR PERIPHERAL IN DOCKING

(75) Inventor: Yao-Kun Cheng, Taipei (TW)

(73) Assignee: Inventec Corporation, Taipei (TW)

( * ) Notice: Subject to any disclaimer, the term of this patent is extended or adjusted under 35 U.S.C. 154(b) by 271 days.

(21) Appl. No.: 11/017,842

(22) Filed: Dec. 22, 2004

(65) Prior Publication Data

US 2006/0133029 A1    Jun. 22, 2006

(51) Int. Cl.
*G06F 1/16* (2006.01)

(52) U.S. Cl. ...................... 361/686; 361/685
(58) Field of Classification Search ......... 361/685–686
See application file for complete search history.

(56) References Cited

U.S. PATENT DOCUMENTS

| | | | |
|---|---|---|---|
| 6,115,245 A * | 9/2000 | Ruch et al. ................. | 361/685 |
| 6,229,440 B1 * | 5/2001 | Fairchild ................. | 340/545.6 |
| 6,885,552 B2 * | 4/2005 | Mullen et al. ............. | 361/686 |
| 7,038,908 B2 * | 5/2006 | Usui et al. .................. | 361/686 |
| 7,054,154 B2 * | 5/2006 | Mullen et al. ............. | 361/686 |

* cited by examiner

Primary Examiner—Yean-Hsi Chang
(74) Attorney, Agent, or Firm—Bacon & Thomas, PLLC

(57) ABSTRACT

The present invention is to provide a device for securely fastening a peripheral in a docking, wherein in response to turning a mechanism of a lock to lift one end of a pivot member in the docking, the other end thereof lowers to press a bar at one end of a lever-like link and lift a block member at the other end thereof respectively by turning about a fulcrum under a bottom of the link. Further, a multibay disposed in the docking has its inner end disposed above the block member and comprises a removing/positioning member having a sliding button and a projection on one side. While inserting a peripheral into a slot of the multibay, a tab thereof pushes the sliding button and the projection into a cavity thereof with an inner end of the peripheral being spaced from the inner end of the multibay by a predetermined distance. And in turn lifting the block member will cause it to urge against a rear end of the peripheral for prohibiting the peripheral from moving the predetermined distance and being withdrawn.

5 Claims, 4 Drawing Sheets

LOCK FOR PERIPHERAL IN DOCKING

FIELD OF THE INVENTION

The present invention relates to computer component security devices, more particularly to a device for locking a peripheral (e.g., a removable second hard disk drive, a CD-R, a Digital Versatile Disk-Read-Only Memory (DVD-ROM), or a floppy disk drive) inserted into a multibay in a docking of a notebook and prohibiting the peripheral from being removed by others.

BACKGROUND OF THE INVENTION

It is often for a notebook user that at least one of a number of cables and cords (e.g., power cord, network cable, mouse cable, printer cable, printer power cord, speaker cable, speaker power cord, etc.) is connected to the notebook irrespective of the notebook being used in office or at home. The user is also bothered by detaching above cables and power cords from the notebook before carrying the notebook out of home or office. The user is further bothered by connecting above cables and power cords to the notebook again before he/she is able to operate the notebook in an indoor environment.

For solving above problem, a docking has been available for easy assembly or disassembly of a peripheral. The docking can be classified as a basic model, an expansion model, and an external model each having respective features. In detail, the basic model comprises a plurality of ports. The expansion model comprises not only the same ports as the basic model but also a multibay at either side of the docking for mounting and connecting to another peripheral such that the notebook can have features substantially the same as that of a typical desk top computer. The external model comprises a universal serial bus (USB) port for connecting to a notebook.

In addition, it is understood that a notebook is a much compact device (i.e., having a limited internal space). It is impossible of mounting all conventional peripherals in a so-called all-in-one type notebook. Further, its hard disk drive is limited in storage space (i.e., having small memory). It is often that a great portion of memory is occupied by data as use continues. Thus, a user may want to install another hard disk drive or backup some data in a Compact Disc-Recordable (CD-R) prior to deleting the same. It is also possible of transmitting data to an external storage device over a local area network (LAN). But this is less convenient as compared with transferring the same data on the notebook directly to a storage device mounted in the notebook. At this time, the above multibay can be used as means for mounting a peripheral (e.g., a removable second hard disk drive, a CD-R, a Digital Versatile Disk-Read-Only Memory (DVD-ROM), or a floppy disk drive) for storing excessive data. Moreover, a second rechargeable battery may be mounted in the notebook for prolonging an operating time thereof. Additionally, a removable data storage device in a desk top computer can be removed prior to mounting in a notebook or vice versa.

A so-called expandable portable architecture is derived from the above concepts. It is characterized in its powerful expansibility. In brief, a user is able to configure a notebook to have any desired functions by expansion. A notebook can remove any peripheral from a hot multibay and integrate platforms for meeting different demands. In another aspect, a user can easily assemble one of a variety of external devices in a notebook or detach the same therefrom.

However, in one example there is no device (e.g., lock) mounted in a docking for inhibiting the theft of a peripheral mounted in a multibay of the docking. The theft is quite possible, resulting in a great loss to the owner of the notebook. In another example, a lock is mounted in the docking. However, such type of lock is complicated in construction, is expensive, and does not operate well with an existing lock of the docking. Thus, it is desirable to provide a novel lock for securely fastening a peripheral in the multibay of a docking in order to overcome the above drawbacks of prior art.

SUMMARY OF THE INVENTION

In view of the discussion in the background section, we can understand that the docking is derived from the concepts of the expandable portable architecture. The docking comprises an internal multibay. However, there is no provision of lock for inhibiting the theft of a peripheral mounted in the multibay, resulting in a great loss to a user. Thus, after considerable research and experimentation, a lock for peripheral in docking according to the present invention has been devised so as to overcome the above drawback of the prior art.

It is an object of the present invention to provide a device for securely fastening a peripheral in a docking, comprising a lever-like link disposed in the docking, a pivot member disposed in the docking wherein in response to turning a mechanism of a lock to lift the other end of the pivot member, one end thereof lowers to press a bar at one end of the link and lift a block member at the other end of the link respectively by turning about a fulcrum under a bottom of the link, and wherein in response to removing a force exerted on either end of the link, an elastic element interconnected the link and the block member is adapted to return both the block member and the bar to their respective original positions. Further, a multibay is disposed in the docking. The multibay has its inner end disposed above the block member such that the lifted block member is adapted to approach the inner end of the multibay. The multibay comprises a removing/positioning member disposed at its internal side. The removing/positioning member comprises a sliding button and a projection both on its one side such that sliding the sliding button a predetermined distance in one direction will resiliently extend the sliding button outwardly, and sliding the sliding button the predetermined distance in the other opposite direction will resiliently retract the sliding button into the removing/positioning member. The multibay further comprises a slot formed at its outer side for permitting a peripheral to insert thereinto. The peripheral comprises a tab and a cavity corresponded to the sliding button and the projection respectively. Whereby inserting the peripheral into the slot of the multibay will cause the tab to push the sliding button and will resiliently push the projection into the cavity with an inner end of the peripheral being spaced from the inner end of the multibay by the predetermined distance and the block member is disposed in the predetermined distance. And in turn lifting the block member will cause it to urge against the rear end of the peripheral for prohibiting the peripheral from moving the predetermined distance. That is, withdrawing the peripheral is prohibited.

It is another object of the present invention to obtain the following advantages by the provision of the lock. (i) By utilizing a simple locking mechanism of the lock, a turning of the mechanism of the lock is converted into a linear movement for locking the peripheral inserted into the multibay in which a lever consisting of the link, the block member at one end, the bar at the other end, and other components cooperates with the removing/positioning member for achieving the locking purpose. As an end, the peripheral is locked and any unauthorized attempt to remove the peripheral will be prohibited. (ii) The lock has a simple mechanism as contrary to complicated locking mechanism of prior lock. Moreover, the manufacturing cost can be reduced significantly. Additionally, it is generally impossible of stealing a peripheral inserted into the multibay of the docking by any unauthorized person and financial loss thus caused and borne upon the owner is eliminated.

The above and other objects, features and advantages of the present invention will become apparent from the following detailed description taken with the accompanying drawings.

DETAILED DESCRIPTION OF THE PREFERRED EMBODIMENTS

Figure 1:
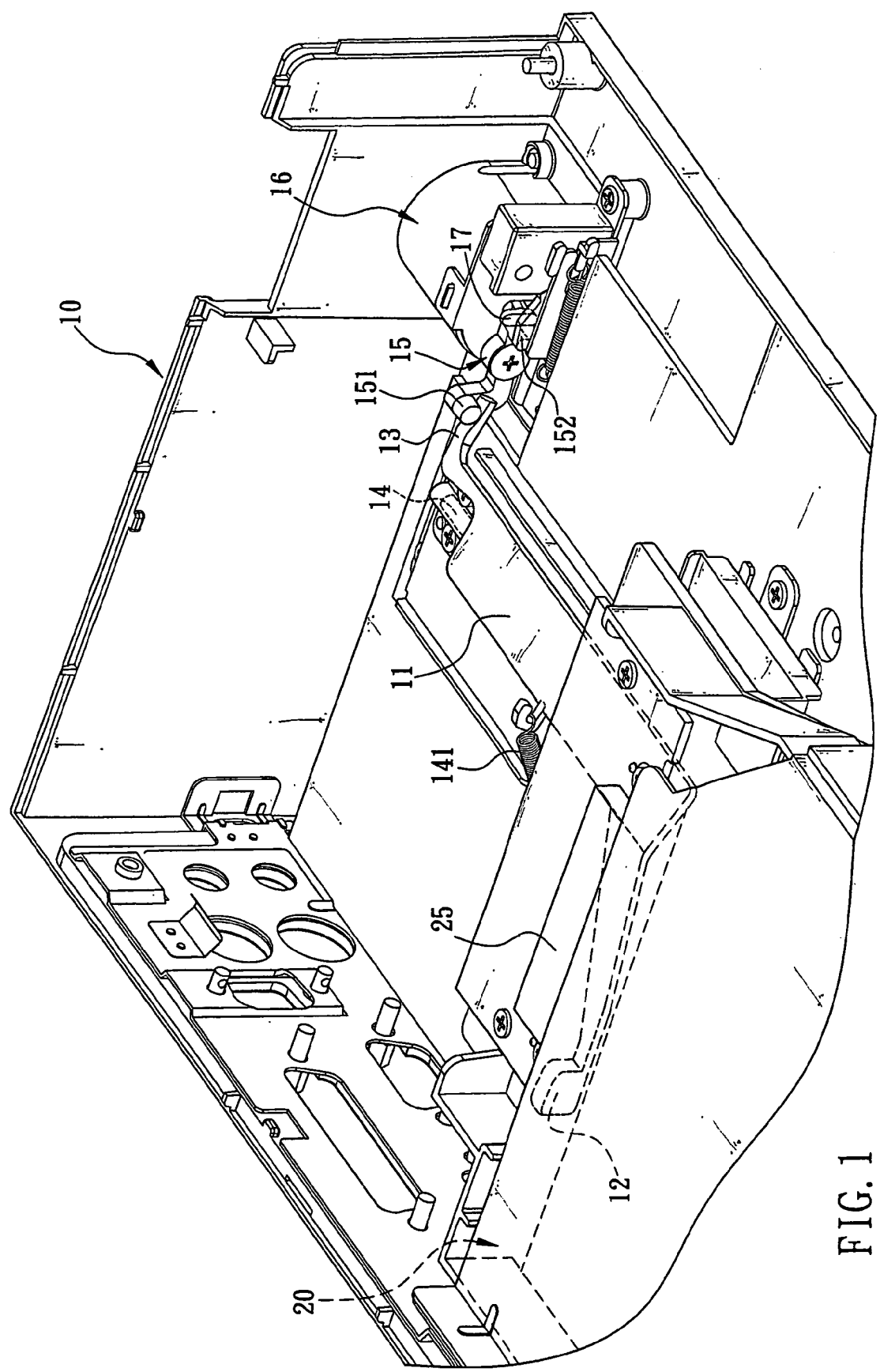
FIG. 1 is a partial perspective view of a docking with its cover removed for showing a lock of the invention and other components.

Referring to FIG. 1, there is shown a lock for securely fastening a peripheral in a multibay of a docking according to the invention. The lock is mounted in a docking 10. The docking 10 comprises an elongate link 11, a block member 12 provided at a portion of the link 11 extended orthogonally from one end of the link 11, a bar 13 provided at another portion of the link 11 extended orthogonally from the other end of the link 11 and extended in a direction opposing the block member 12, a fulcrum 14 provided under a bottom of the link 11, and an elastic element 141 resiliently interconnected the body of the link 11 and the block member 12. In the embodiment of the invention, the elastic element 141 is a spring. The link 11 thus functions as a lever by turning about the fulcrum 14 in which a force applied at the block member 12 will lift the bar 13 (i.e., lower the block member 12) or a force applied at the bar 13 will lift the block member 12 (i.e., lower the bar 13). Moreover, the provision of the elastic element 141 enables both the block member 12 and the bar 13 to return to their respective original positions after the force is removed.

Figure 2:
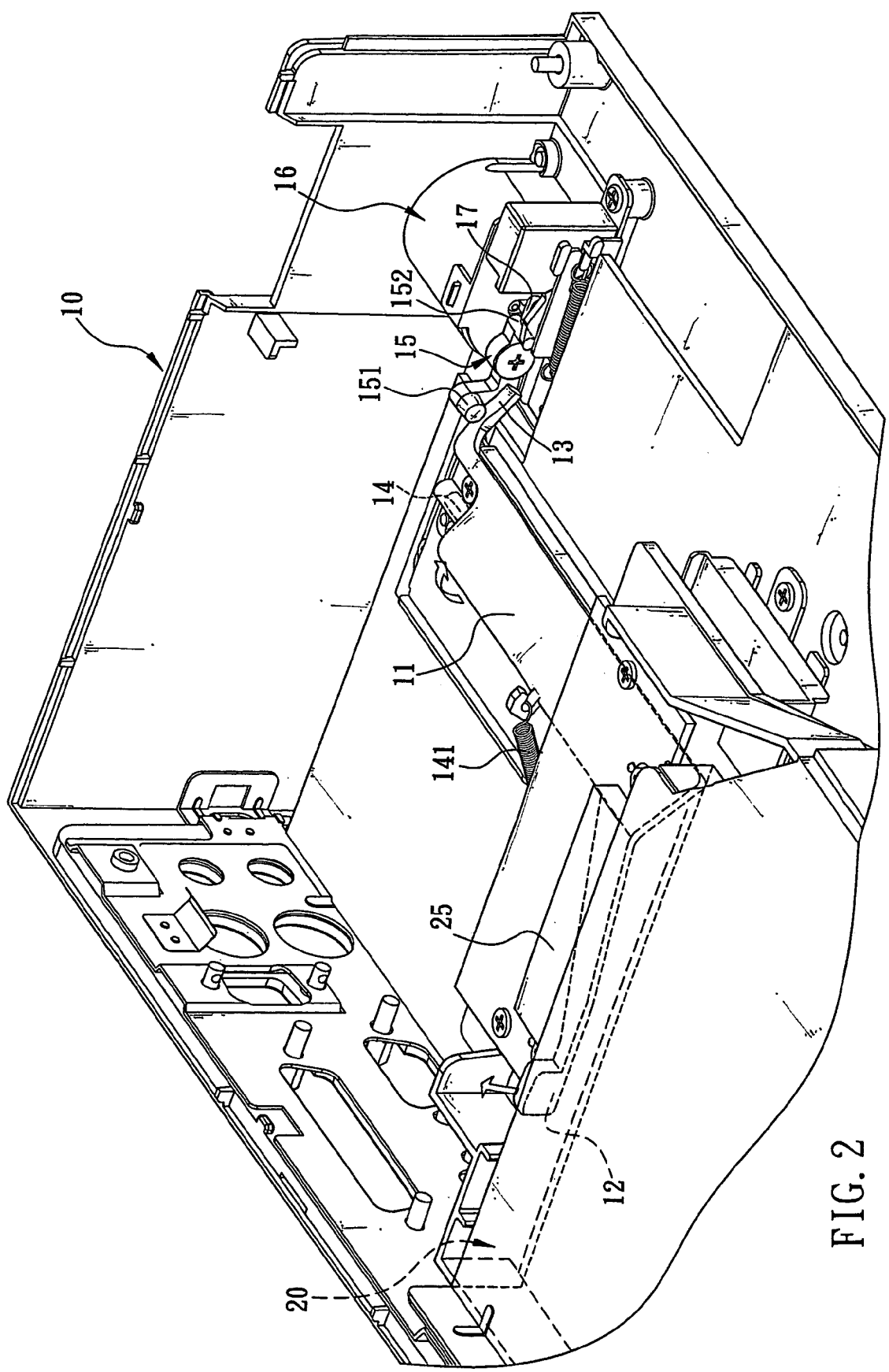
FIG. 2 is a view similar to FIG. 1 for showing an operation of the lock.

Referring to FIG. 1 again, in the invention in the docking 10 there are further provided a pivot member 15 having one end 151 disposed on the bar 13 and the other end 152 provided in a mechanism 17 of a lock 16. Referring to FIG. 2, a user may turn the mechanism 17 to lock the lock 16. In the locked state, the other end 152 of the pivot member 15 is lifted and to the contrary one end 151 of the pivot member 15 lowers to press the bar 13. In response, the block member 12 lifts by turning the link 11 on the fulcrum 14. In a reverse operation, the user can turn the mechanism 17 in an opposite direction to open the lock 16. In the open state, both the link 11 and the pivot member 15 return to their respective original positions due to an expansion of the elastic element 141 (see FIG. 1).

Figure 3:
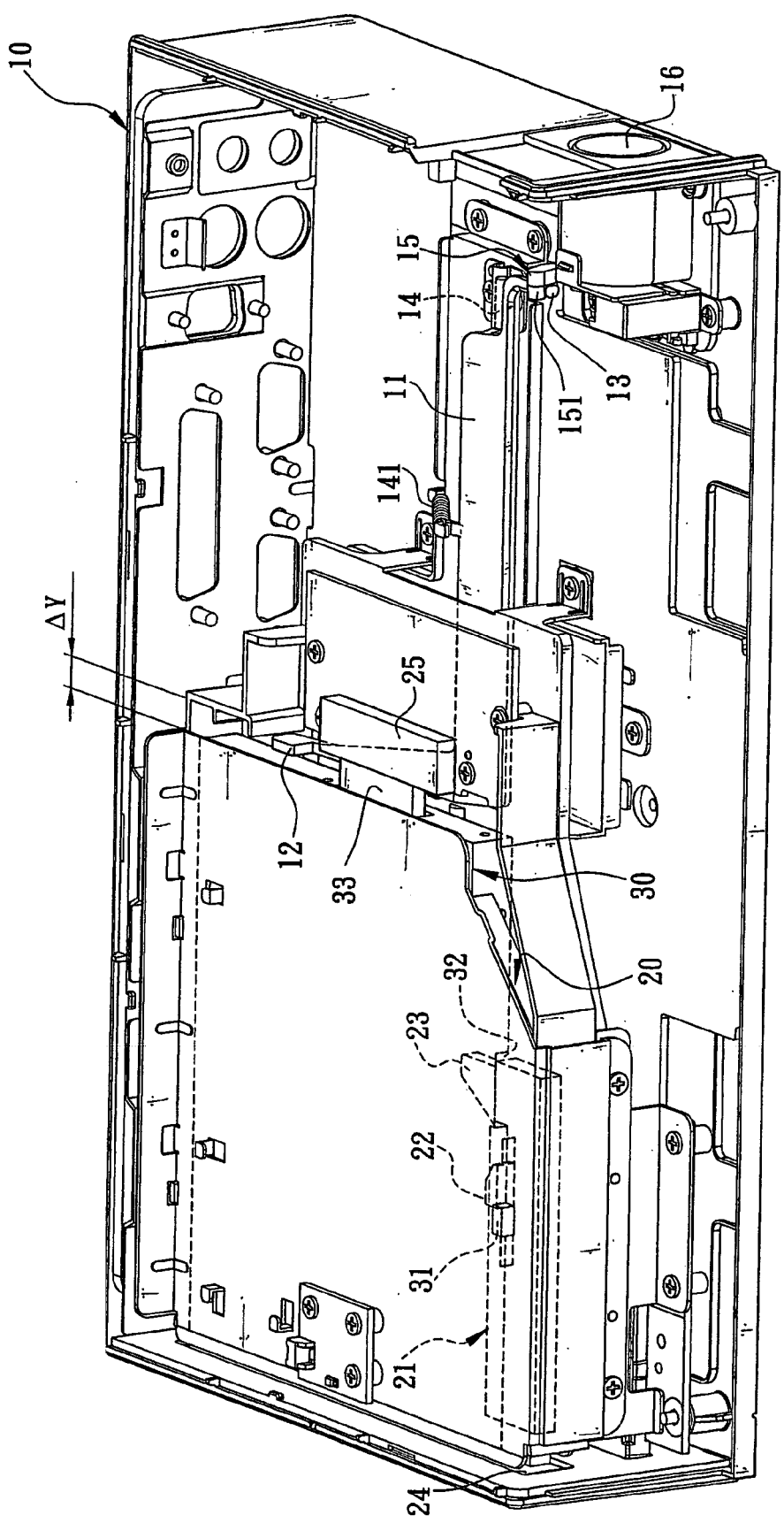
FIG. 3 is a perspective view of the docking with its cover removed for showing the lock in its another operational state.
Figure 4:
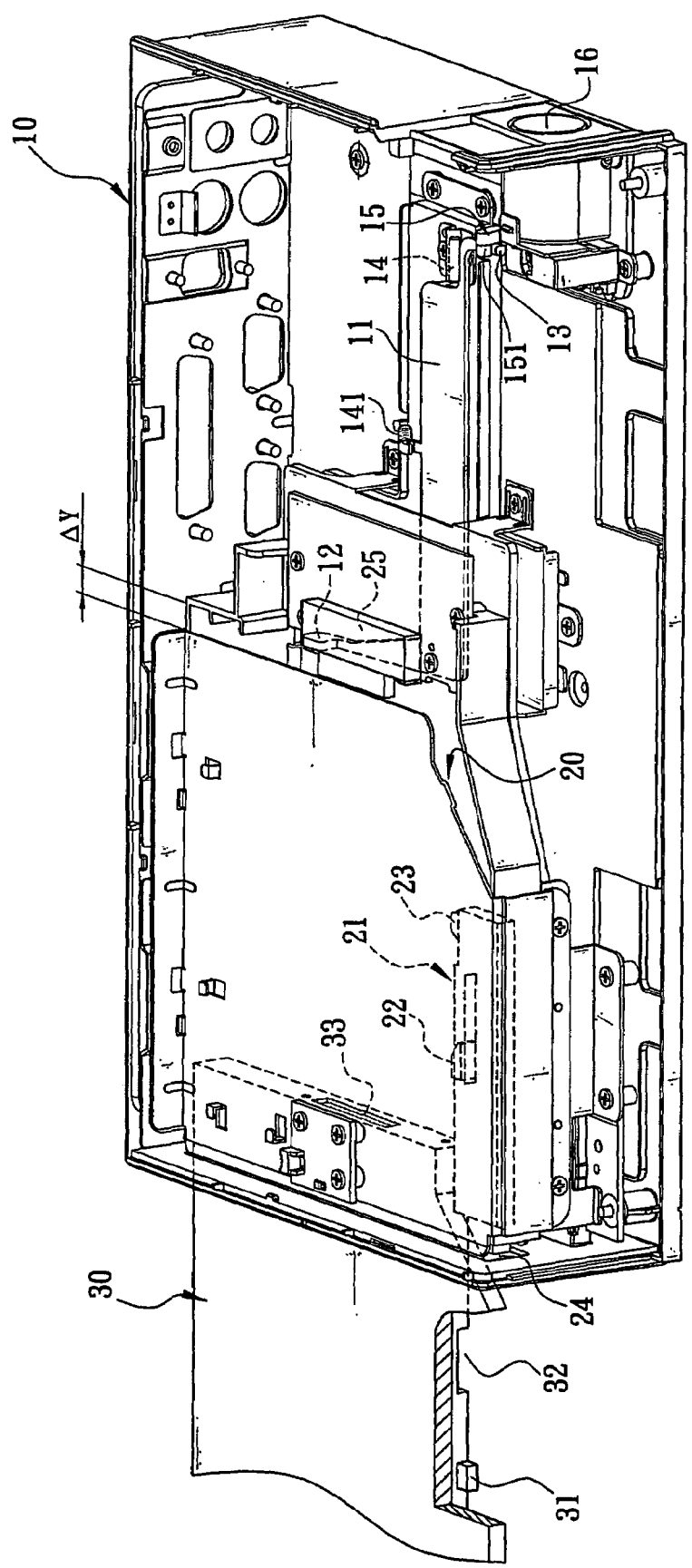
FIG. 4 is a view similar to FIG. 3 for showing the lock in its yet another operational state.

Referring to FIGS. 3 and 4, in the invention in the docking 10 there is further provided a multibay 20. The multibay 20 has its inner end provided above the block member 12. The lifted block member 12, caused by a linking mechanism of the link 11, is proximate the inner end of the multibay 20 (see FIGS. 2 and 3). A removing/positioning member 21 is provided at an internal side of the multibay 20. The removing/positioning member 21 comprises a sliding button 22 and a projection 23 both on its one side. Sliding the sliding button 22 a predetermined distance in one direction will resiliently extend the sliding button 22 outwardly (see FIG. 3). To the contrary, sliding the sliding button 22 the predetermined distance in the other opposite direction will resiliently retract the sliding button 22 into the removing/positioning member 21 again, i.e., return to its original position as shown in FIG. 4.

Referring to FIGS. 3 and 4 again, in the invention a peripheral (e.g., a removable second hard disk drive, a CD-R, a DVD-ROM, or a floppy disk drive) 30 can be inserted into a slot 24 formed at an outer side of the multibay 20. On a bottom of the peripheral 30 there are provided a tab 31 and a cavity 32. The tab 31 and the cavity 32 correspond to the sliding button 22 and the projection 23 respectively. In a process of inserting the peripheral 30 into the slot 24 of the multibay 20 by a user (see FIG. 4), the tab 31 on the bottom of the peripheral 30 pushes the sliding button 22. After the sliding button 22 is pushed a predetermined distance, a stored elastic energy of the sliding button 22 will push the projection 23 outwardly to fit into the corresponding cavity 32 of the peripheral 30 (see FIG. 3). Thus, a port 33 of the peripheral 30 is connected to a port 25 of the multibay 20. At this time, the inner end of the peripheral 30 is spaced from an inner end of the multibay 20 by a distance ΔY Also, the block member 12 is disposed in the distance ΔY and lifts to urge against the rear end of the peripheral 30. As an end, the peripheral 30 is unable to move the distance ΔY and thus is prevented from withdrawing.

It is clearly seen from the above construction that for withdrawing the peripheral 30 from the multibay 20 a number of steps should be taken (see FIG. 3). First, a user turns the mechanism 17 in one direction to lower the block member 12 away from its urged position at the rear end of the peripheral 30. That is, the distance ΔY serves as an allowed moving distance of the block member 12. In response, the peripheral 30 moves to cause its tab 31 to push the sliding button 22 again. Also, the projection 23 retracts into the removing/positioning member 21 and the peripheral 30 is thus unfastened (see FIG. 4). As such, the stored elastic force of the sliding button 22 pushes the peripheral 30 out of the slot 24 of the multibay 20. At the same time, the port 33 of the peripheral 30 smoothly, stably clears the coupled port 25 of the multibay 20.

To the contrary, a user can turn the mechanism 17 in the other opposite direction to lift the block member 12 due to a linking mechanism of the pivot member 15 and the bar 13. Again, the rear end of the peripheral 30 is urged by the block member 12 and is thus prevented from moving (see FIG. 3). As an end, the projection 23 is still held captive in the cavity 32 of the peripheral 30 (i.e., peripheral 30 withdrawing prohibited).

By utilizing a simple locking mechanism of the invention, a turning of the mechanism 17 of the lock 16 is converted into a linear movement for locking the peripheral 30 inserted into the multibay 20 in which a lever consisting of the link 11, the block member 12 at one end, the bar 13 at the other end, and other components cooperates with the removing/positioning member 21 for achieving the locking purpose.

As an end, the peripheral 30 is locked and any unauthorized attempt to remove the peripheral 30 will be prohibited.

In brief, drawbacks associated with the prior art such as easy theft of a peripheral 30 inserted into a multibay 20 of a docking 10 and financial loss thus caused and borne upon the owner can be eliminated. Moreover, the lock has a simple mechanism as contrary to complicated locking mechanism of prior lock. As a result, the manufacturing cost can be reduced significantly.

While the invention herein disclosed has been described by means of specific embodiments, numerous modifications and variations could be made thereto by those skilled in the art without departing from the scope and spirit of the invention set forth in the claims.

What is claimed is:

1. A device for securely fastening a peripheral in a docking, comprising:

a link disposed in the docking, the link comprising a block member extended orthogonally from its one end, a bar extended orthogonally from its another end and extended oppositely of the block member, a fulcrum disposed under a bottom of the link, and an elastic element resiliently interconnected the link and the block member wherein in response to a force exerted on either end of the link, the link is adapted to function as a lever by turning about the fulcrum with the block member lifting and the bar lowering taken turns with the block member lowering and the bar lifting, and the elastic element is adapted to return both the block member and the bar to their respective original positions after the force is removed;

a pivot member disposed in the docking, the pivot member having one end disposed on the bar;

a lock comprising a mechanism with another end of the pivot member disposed therein wherein in response to turning the mechanism to lock the lock, the another end of the pivot member is lifted and one end thereof lowers to press the bar and lift the block member respectively; and a multibay disposed in the docking, the multibay having its inner end disposed above the block member such that the lifted block member is adapted to approach the inner end of the multibay, the multibay comprising a removing/positioning member disposed at its internal side, the removing/positioning member including a sliding button and a projection both on its one side such that sliding the sliding button a predetermined distance in one direction will resiliently extend the sliding button outwardly, and sliding the sliding button the predetermined distance in an opposite direction will resiliently retract the sliding button into the removing/positioning member.

2. The device of claim 1, wherein the multibay further comprises a slot formed at its outer side for permitting the peripheral to insert thereinto, and wherein the peripheral comprises a tab and a cavity corresponded to the sliding button and the projection respectively, and whereby inserting the peripheral into the slot of the multibay will cause the tab to push the sliding button and will resiliently push the projection into the cavity with an inner end of the peripheral being spaced from the inner end of the multibay by the predetermined distance and the block member is disposed in the predetermined distance, and lifting the block member will cause it to urge against the inner end of the peripheral for prohibiting the peripheral from moving the predetermined distance.

3. The device of claim 2, wherein both the tab and the cavity are formed on a bottom of the peripheral.

4. The device of claim 2, wherein the peripheral is a removable second hard disk drive, a CD-R, a DVD-ROM, or a floppy disk drive.

5. The device of claim 1, wherein the elastic element is a spring.

* * * * *